United States Patent [19]
Good et al.

[11] Patent Number: 5,219,379
[45] Date of Patent: Jun. 15, 1993

[54] ANGULAR ALIGNMENT ASSEMBLY

[76] Inventors: John M. Good, 121 Trail Driver, Austin, Tex. 78737; Alvin W. Sather, 821 Wagon Trail, Austin, Tex. 78758

[21] Appl. No.: 588,330

[22] Filed: Sep. 26, 1990

[51] Int. Cl.$^5$ .......................... G01B 5/24; B23Q 17/22
[52] U.S. Cl. ........................................ 33/642; 33/645; 33/1 N; 33/1 PT
[58] Field of Search ................. 33/626, 638, 645, 642, 33/502, 567, 1 PT, 1 N; 409/214, 218; 428/116

[56] References Cited

U.S. PATENT DOCUMENTS

| | | | |
|---|---|---|---|
| 3,763,570 | 10/1973 | Andersen | 33/370 |
| 3,813,989 | 6/1974 | Janci | 409/218 |
| 4,085,515 | 4/1978 | Darden | 33/377 |
| 4,269,000 | 5/1981 | Rutter | 33/645 |
| 4,406,069 | 7/1983 | Clement | 33/642 |
| 4,437,803 | 3/1984 | Volna | 33/642 |
| 5,121,555 | 6/1992 | Jiorle | 33/645 |

Primary Examiner—William A. Cuchlinski, Jr.
Assistant Examiner—Alvin Wirthlin

[57] ABSTRACT

An instrument for aligning the spindle of machine tools such as drill presses or vertical milling machines at various angles with respect to a work surface. In one embodiment the upper portion of an elongated shaft is engaged in a chuck or collet of the spindle while the lower potion is operably mounted to shaft bearings, which permits the shaft to pivot, rotate and to move vertically and horizontally with respect to the work surface of the machine tool. A displacement detector for detecting pivotal movement of the shaft is mounted on a member of the shaft bearing in fixed relation to the pivot of the shaft. A linear interface provides contact between the shaft and displacement detector and permits predictable repeatable movement of the displacement detector. A translating interface or computer, in the form of an electronic circuit, interprets movement by the displacement detector into data describing the angular position of the shaft and a display panel receives the data and displays it for the operator of the instrument. A frame base can be interposed between the shaft bearings and work surface to facilitate the instrument's mounting and enclosure.

26 Claims, 9 Drawing Sheets

ANGULAR ALIGNMENT ASSEMBLY

BACKGROUND OF THE INVENTION

1. Field of the Invention

The present invention relates to an alignment assembly and a method of alignment using said assembly to determine or establish an angle between a tool mounting assembly, such as a rotatable chuck and a flat surface, such as the work surface of a machine tool assembly.

2. Description of the Relevant Art

In the daily practice of using a machine tool for machining mechanical components there arises the necessity for adjusting the tool mounting assembly of the machine tool through various angles in order to facilitate the proper cutting and shaping of the material being machined. It is often necessary to adjust the angular alignment of the machine tool to high precision. After work is accomplished at these various angles it is desirable to restore the tool mounting assembly to an angle perpendicular to the working surface of the machine tool, and to do so with a high degree of accuracy. In the present situation a skilled craftsman must spend a great deal of time and labor using various tools such as squares, sine bars, dial indicators and the like to properly position the tool mounting assembly. The situation is further complicated in that the clamping mechanism used to hold the tool mounting assembly securely in the desired position can alter its position in an irregular manner while it is being tightened thus requiring that the craftsman anticipate the movement of the assembly during the tightening and adjustment procedure. Often the result is that repeated trial and error attempts must be made to align the machine tool within acceptable tolerances. It is therefore obvious to one familiar with the present art that this is a time consuming and inefficient procedure both in regard to the overall cost of manufacturing and labor and also the required tedium on the part of the craftsman.

In the past, efforts to achieve such angular alignment with the work surface has involved the use of an alignment device of the type described in U.S. Pat. No. 4,437,803 issued Mar. 20, 1984. This patent pertains to an apparatus for squaring the spindle or tool holding assembly with respect to the work surface of the milling machine by utilizing a cylinder or shaft inserted into the tool holding assembly. The lower portion of the shaft extends into a second cylindrical member and moves freely within the second cylinder. The second cylinder in turn pivots in perpendicular orientation to the axis of the shaft on a third member of the device forming a frame. The frame makes contact with the work surface utilizing at least two contact points and supports an indicator which makes contact with the second cylinder and quantizes the position of the lower portion of the shaft during the alignment procedure relative to the frame which is staying in parallel orientation with the work surface by virtue of the points of the frame in contact with it. Squareness or perpendicularity of the tool holding assembly is established by adjusting the tilt of the tool holding assembly until the indicator shows a predetermined position to indicate perpendicularity. An alternative embodiment of the device makes this procedure simpler by arranging an indicator with two dials which facilitate making comparative measurements by indicating the direction of tilt of the tool holding assembly and by increasing the sensitivity of indication by making the two dials line-up with each other in the position of perpendicularity. However, such a device still requires skill and time on the part of the user for precise squaring of the tool holding assembly and is not useful for establishing alignment at angles other than the one at perpendicularity for reasons which will become obvious with further explanation.

The prior art concern is intended for establishing the perpendicularity of the tool holding assembly and makes use of indicators and apparatus which are only useful for this purpose. If one tried to align the tool holding assembly at 5 degrees, for example, readings by the indicator would no longer be accurate or meaningful for the purpose of quantitatively determining an angle. First, an error is introduced in the displacement of the indicator because the actual displacement quantized by the indicator is the tangent of 5 degrees multiplied by the length of shaft between the pivot point of the second member and the point of contact of the indicator in the perpendicular position. At the same time a second error is introduced at the contact point of the indicator with the second member of the device because the point of contact is always changing as the angle of the shaft changes, and depending on the geometry of the tip of the indicator the error introduced can be quite complex. For example, if the tip of the indicator is rounded or in contact with a radial surface of the second member, as in the alternative embodiment of the above noted prior art, the error introduced would make the actual angle of inclination of the chuck difficult, if not impossible, to determine. A third and more obvious error is introduced by the indicator itself since its purpose is to determine perpendicularity and to quantize displacement to the right or left of perpendicularity. The equally spaced intervals or other indicia of the indicator serve only to show whether this tilt is small or great. Thus the dial display of such on indicator cannot convert to meaningful output in degrees of angle away from perpendicularity. Furthermore, the prior art of reference makes no mention of measuring or quantizing angles other than perpendicularity. Rather, it is the perpendicularity which is quantified by the indicator, and the making on its face, by merely showing the direction, clockwise or counter-clockwise, which the tool holding assembly is out of perpendicular alignment. It is obvious, therefore, that the above mentioned prior art is unsuitable for alignment at angles away from the one perpendicular to the work surface and was never intended to do so.

SUMMARY OF THE INVENTION

To prevent the aforementioned drawbacks the present invention provides an angular alignment assembly which: (a) is portably and easily positioned on the work surface of the machine tool, (b) is easily and directly engaged to the tool mounting assembly, (c) is easily and accurately calibrated by the user, (d) provides a continuously readable reference to the condition of alignment of the machine tool while it is being aligned, and (e) provides a method of alignment which requires no special skill on the part of the user to set up gauges and compare or interrupt their results.

The alignment assembly of the present invention is positioned on the work surface of a typical machine tool such as a vertical end mill familiar to those in the art and provides a shaft which extends through an opening in the alignment assembly cover and into the tool mounting assembly or chuck of the end mill, and is secured in the chuck according to known technique. The shaft adjusts in height according to the needles of the device being aligned by sliding upward or downward in the direction of its linear axis in shaft bearing means in the form of a sleeve bearing. The sleeve bearing is mounted pivotally to a second part of the shaft bearing means in the form of a frame which slides along an axis of adjustment of the work surface and in parallel relation to it, thereby allowing the shaft to translate horizontally with respect to the work surface. The combination of the sleeve bearing and frame therefore form shaft bearing means which permit both horizontal and vertical movement of the shaft with respect to the work surface, thereby allowing the machine tool to be adjusted while the shaft is engaged in the tool holding assembly. The shaft, together with the shaft bearing means, form the shaft assembly.

The shaft assembly allows angular translation of the shaft, and hence, the tool holding assembly in the particular axis of adjustment in which the device is set up to align; however, since the tool holding assembly may also be tilted in the other axis of adjustment the shaft assembly must be able to provide function in angles away from parallel with respect to the second adjustment axis. In one embodiment the bottom surface of the shaft assembly and more specifically the shaft bearing is rounded to facilitate tilting in the other axis of adjustment.

The bottom of the shaft assembly may directly contact the work surface of the machine tool assembly. However, to facilitate smoother operation and setting up of the device a frame base can be interposed between the shaft assembly and the work surface. In one embodiment the frame base appears in the form of a flat plate having squared sides for setting up the device, as described in detail below, and a rounded groove for engaging the bottom of the shaft assembly just described, thereby providing a flat, rigid and wearable surface between the shaft assembly and the work surface.

Mounted also on the linear bearing means is displacement detecting means in the form of a digital electronic probe containing a displacement detecting element which is biased to contact the shaft bearing. Interposed between the shaft assembly and the displacement detecting element is linear interface means which assists in mechanically translating the pivotal motion of the shaft assembly into motion of the displacement detecting element. The displacement of the detecting element can be readily and accurately interpreted into information concerning the angle of inclination of the tool holding assembly. The linear interface means of one particular embodiment consists of a rounded tip of known radius.

The computation means, described in detail below, can automatically compensate for the changing surface of contact between the radiused surface and the shaft assembly since the radius of the surface is known. To simplify the calculation required to determine the angle of inclination of the shaft, the surface contacting the linear interface means can coincide with the axis of the pivot point of the shaft assembly, thereby providing, by mechanical means, a more direct mathematical relationship between the pivoting motion of the shaft and the movement of the displacement detecting element.

The linear axis of the detecting element is positioned a known distance from the pivot point of the shaft bearing and in generally parallel orientation with the bottom of the shaft bearing means or frame, and therefore with the work surface. The digital electronic probe is calibrated so that the position of perpendicularity of the shaft is known and precisely measures the horizontal displacement of the shaft bearing from this position as it pivots. Since the height of the probe above the pivot point is precisely known the necessary information is obtained to mathematically calculate the angle of inclination of the shaft bearing and therefore the shaft and tool holding assembly.

A digital electronic computer contained as part of the assembly receives measurement output from the displacement detecting means and is programed to automatically calculate the angle of inclination of the shaft. Communication means in the form of a digital electronic display communicates the angle of inclination of the shaft to the user. To facilitate the calibration process a detent mechanism can be incorporated so that the detent mechanism positions the shaft in precisely perpendicular relation to the work surface. In one embodiment the detent mechanism is interposed between the sleeve bearing and the shaft bearing means in the form of a "v" groove and a biased probe having a rounded end. The probe engages the "v" groove at the precise location of perpendicularity thereby permitting the displacement detecting means to be "zeroed" or otherwise reset so that a reference position is established.

Having summarized the possible features of one embodiment of the angular alignment assemble, alternate embodiments of particular features of the device are now addressed.

In an alternative embodiment of the shaft assembly the shaft is connected directly to the pivoting means. The pivoting means attaches to shaft bearing means in the form of a first and second frame member. The first frame member translates vertically with respect to the work surface and is operably mounted to the second member which translates horizontally with respect to the work surface. The combination of the first and second frame members therefore form shaft bearing means which permit both horizontal and vertical movement of the shaft with respect to the work surface, thereby allowing the machine tool to be adjusted while the shaft is engaged in the tool holding assembly. The displacement detecting means is mounted on the first frame member in rigid relation to the pivot means, and detent means can be interposed between the shaft and first member for calibration of the alignment assembly.

In yet another embodiment of the shaft assembly the shaft is pivotally mounted to a first frame member of the shaft bearing means which translates horizontally on a second frame member. The second frame member in turn translates vertically on a third frame member which contacts the work surface. The combination of the first, second and third frame, therefore, form shaft bearing means which permit both horizontal and vertical movement of the shaft with respect to the work surface, thereby allowing the machine tool to be adjusted while the shaft is engaged in the tool holding assembly. The displacement detecting means is mounted on the first frame member in rigid relation to the pivot means.

The linear interface means can appear in many forms. In one embodiment the proximity detecting element has a point centered on the shaft of the detecting element. This allows the displacement detector to accurately follow the pivoting surface of the shaft assembly without inaccuracies introduced by different points on the tip of the detecting element engaging the shaft assembly as the angle of inclination changes. In an alternative embodiment a pivoting flat surface is mounted to the end of the detecting element which contacts a flat surface of the shaft or sleeve bearing. As the shaft pivots during use the pivoting surface slides over the flat surface of the shaft assembly and accurately positions the detecting element as it engages the shaft assembly.

In yet another embodiment a roller bearing is mounted on the tip of the detecting element thereby permitting smoother contact with the engaged surface as it pivots. Inaccuracies introduced by the curvature of the bearing surface are linear in nature and are compensated for by the computation means.

An additional embodiment of the linear interface means involves the use of a linear race journaled pivotally to the center of a sleeve bearing which, in turn, fits closely around the shaft for allowing free axial movement of the shaft in the bearing. The linear race is operably mounted to the shaft bearing means and, more specifically, to the same member as the pivot means and displacement detecting means, and is restricted to the movement parallel to the work surface. The displacement detecting element contacts a surface of the linear race so that, as the shaft pivots during use, it precisely follows the horizontal displacement of the shaft in the plane of movement of the linear race, thereby providing a measurement which can easily be utilized for calculating the angular displacement of the shaft. The sleeve bearing of this embodiment serves also as part of the shaft bearing means; however, in embodiments in which the shaft pivots directly on the pivoting means, the shaft bearing serves only as part of the linear interface means.

Depending on the type of displacement detecting means used, the linear interface means can also be embodied in additional forms. Some embodiments of the angular alignment assembly utilize displacement detecting means in the form of an encoder head and glass scale, in which the glass scale contains equally distributed and proportioned lines which are detected by opto-electronic means by the encoder head. The encoder head sends electrical pulses or wave forms, corresponding to the displacement of the glass scale, to the computation means for interpretation into displacement measurements and angular displacement of the shaft. While either the encoder head or glass scale can be the moving element of the displacement detecting means and thus serve as the displacement detecting element, the embodiment considered here uses the encoder head as the moving or detecting element. The linear interface means mechanically linking the shaft to the displacement detecting means is similar to previous embodiments using a linear race and sleeve bearing. However, instead of the displacement detecting element directly contacting a surface of the linear race, coupling means in the form of a system of pulleys and a flexible metal band link the detecting element to the linear race and thus to the shaft.

Some embodiments of the angular alignment assembly utilize displacement detecting means in the form of a shaft encoder. The shaft encoder translates rotational motion into electronic pulses for interpretation into meaningful measurements of angular displacement. In one such embodiment the detecting element or shaft of the shaft encoder is coupled directly to the pivot point of the shaft assembly while the body of the encoder is mounted to the same member as the pivot means. As the shaft pivots during the alignment procedure, output from the shaft encoder is processed by the computation means and which in turn delivers output to a digital readout regarding the angle of inclination of the shaft.

Alternative embodiments using shaft encoders as the displacement detecting means, however, permit the use of encoders of lower precision and less sophisticated electronic support, thereby allowing a substantial savings in the manufacture and final cost to the user. In one such embodiment the linear interface means appears as a radial element contained as an integral part of the shaft bearing, the radial portion being smooth and centered on the pivot point for engaging the shaft of the shaft encoder. As the shaft pivots during the alignment procedure the encoder shaft rotates at an increased rate due to the difference in radius ratio between the radial element and the encoder shaft. The increased ratio of turning on the part of the encoder produces a higher number of displacement counts per angle of translation on the part of the shaft thereby enhancing, by mechanical means, the accuracy of the device. In a similar embodiment the linear interface means is a pulley system interposed between the shaft and the encoder shaft which can convert a small degree of angular translation by the shaft into a larger degree of angular translation on the part of the encoder shaft.

DESCRIPTION OF THE PREFERRED EMBODIMENTS

Figure 1:
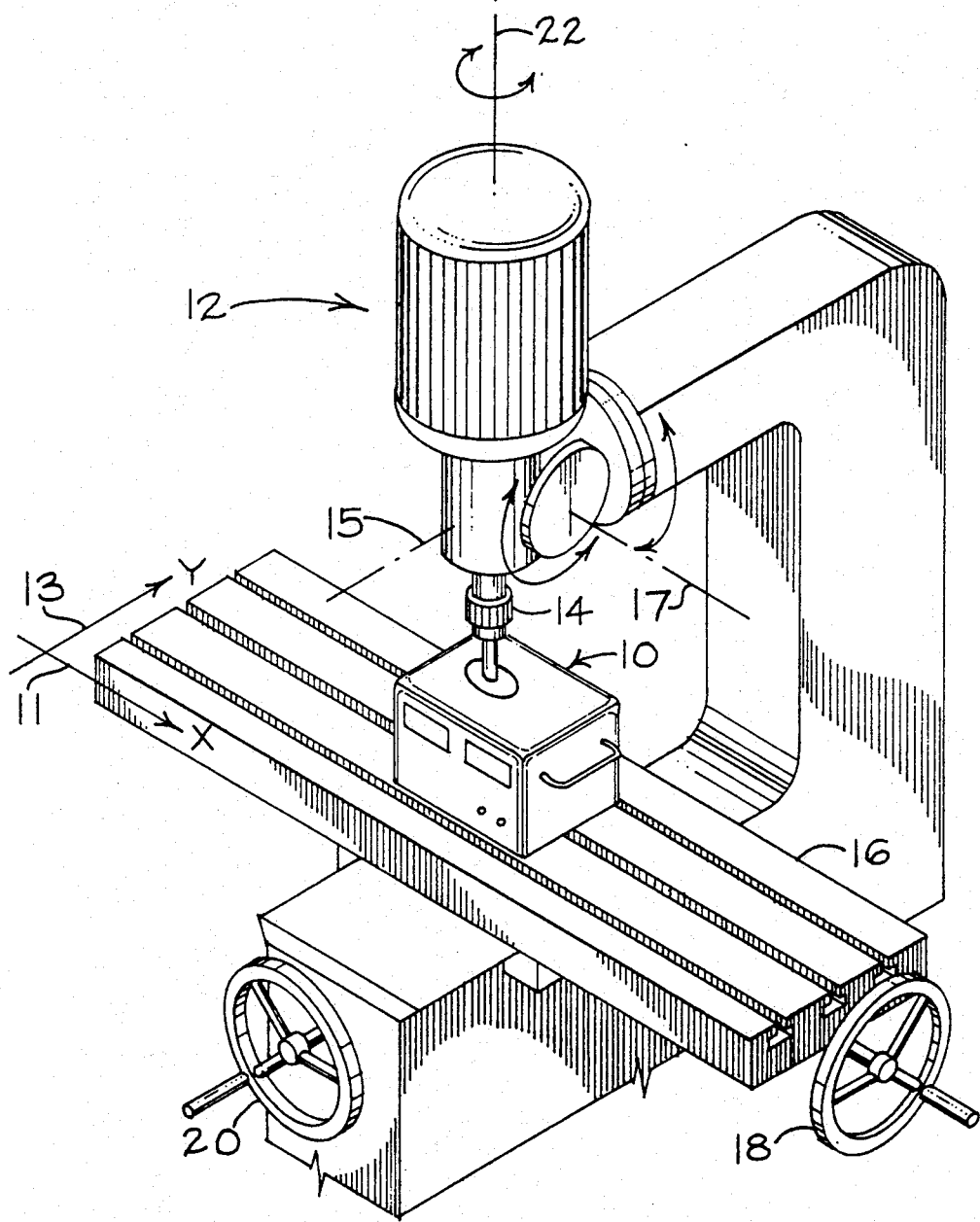
FIG. 1 is a view of the angular alignment assembly of the present invention mounted on the work surface and within the chuck of a machine tool assembly.

The present invention is directed toward an alignment device generally indicated at 10 and its method of operation for establishing or determining angular alignment between a shaft mounting assembly and a flat surface. In FIG. 1 the alignment assembly 10, is shown located on the flat surface or work surface of a typical machine tool assembly 12 such as a vertical milling machine familiar to those in the art. The shaft mounting assembly and flat surface may be embodied for example in the tool holding assembly or chuck 14 and adjustable table 16 respectively, which includes controls X 18 and Y 20 for adjusting of the table 16 about perpendicular axes X 11 and Y 13. The axes of angular adjustment, 15 and 17, of the tool holding assembly 14 may be in line with the axis of adjustment of the table controls X and Y. The tool mounting assembly can be adjusted with respect to its angle of inclination in the direction of either or both axes 15 and 17.

The method and apparatus of the present invention are directed to establishing angular alignment between the flat surface or work surface of table 16 and the axis 22 of the tool holding assembly or chuck 14. With such angular alignment established between the table and chuck, a drill or milling bit (not shown) or otherwise mountable device mounted in the chuck 14 will be at an exactly predetermined alignment with the flat surface or work piece (not shown) mounted on the flat surface of the table 16. For example the tool mounting assembly could be aligned at an angle of 17 degrees 17 arc minutes and 17 arc seconds with respect to a line perpendicular to the work surface by use of the present invention. Once work is completed requiring this angle of alignment the angular alignment assembly can be used to align the tool holding assembly to another desired angle.

Figure 2:
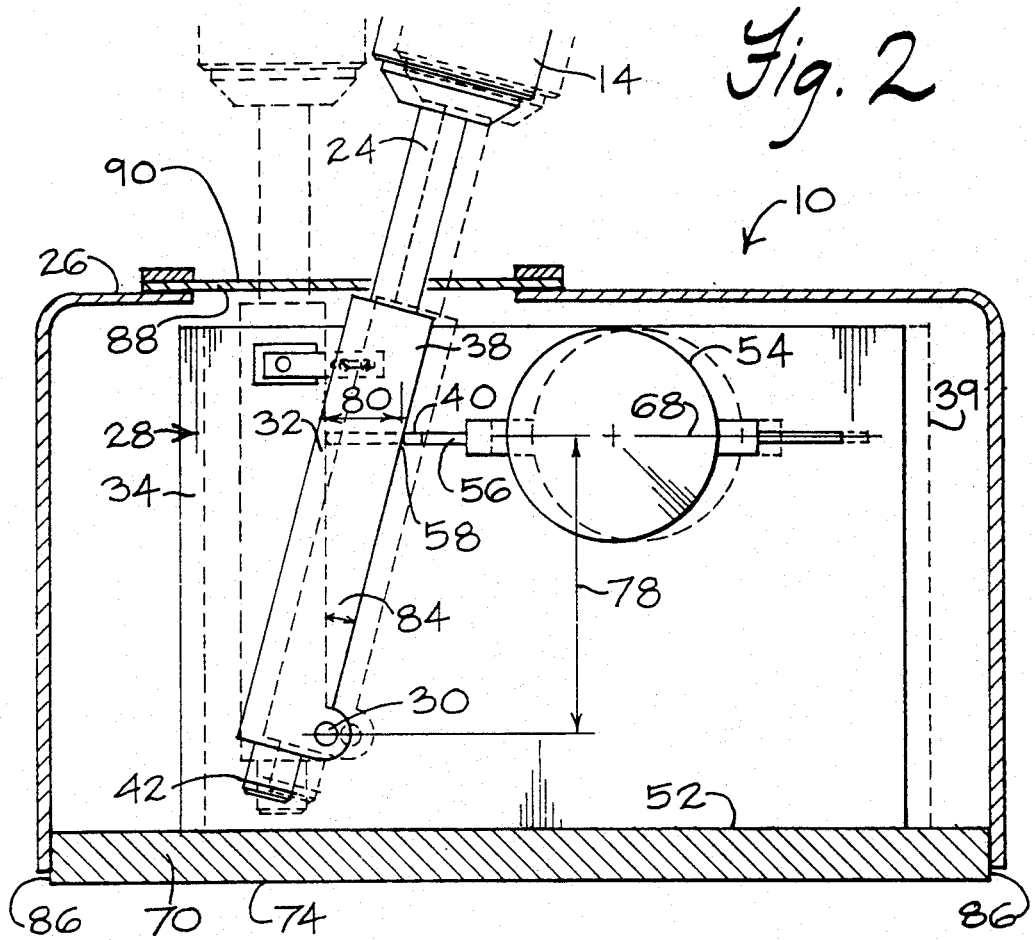
FIG. 2 is a front elevational view of the angular alignment assembly of the present invention.
Figure 3:
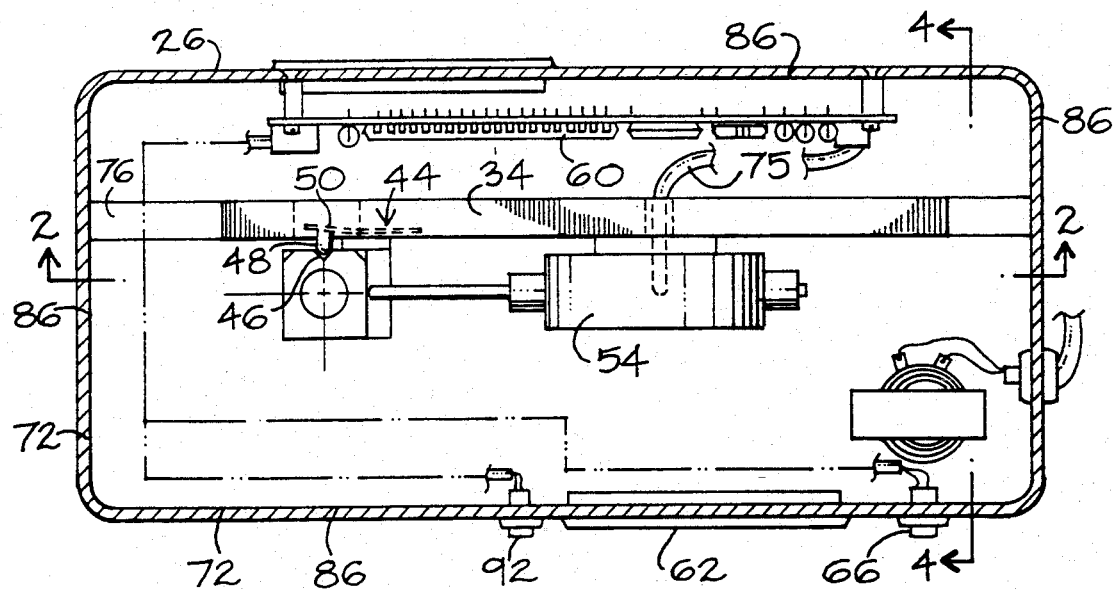
FIG. 3 is a top sectional view in partial section of FIG. 2.
Figure 4:
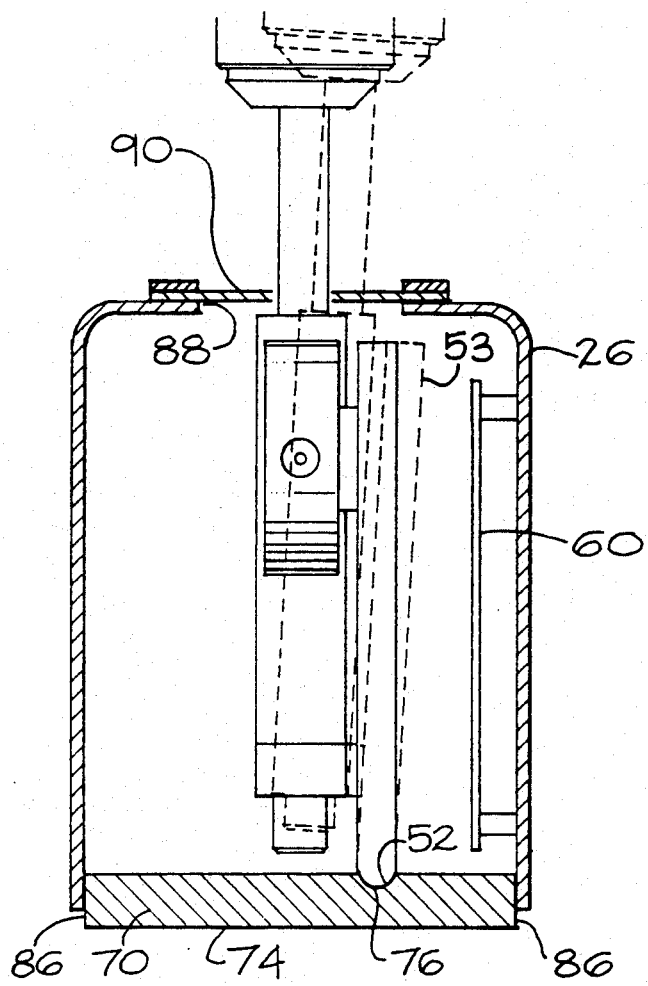
FIG. 4 is a side elevational view of an alternate embodiment of the angular alignment assembly of the present invention.

The angular alignment assembly 10 shown in FIGS. 2, 3, and 4 illustrates a shaft assembly which includes an elongated shaft 24, shaft bearing means 28 and pivoting means 30.

The shaft 24, which may be fabricated from precision ground stock or similarly tooled metal, extends through an opening in the alignment assembly cover 26 and into the chuck 14 of the vertical milling machine, and is adapted for mounting into the chuck. The shaft extends through first shaft bearing means in the form of a sleeve bearing 32 made of metal which closely fits the diameter of the shaft and allows the shaft to rotate and to move freely in the direction of its linear axis.

The sleeve bearing 32 is mounted pivotally to a second shaft bearing means, or angle measuring support means, in the form of a rectangular plate 34, by means of pivoting means 30. The pivoting means is in the form of a pivot pin and extends through the sleeve bearing 32 and into the plate 34 in such a manner that the pivotal axis, or first axis of the sleeve bearing is generally perpendicular to the surface of the plate 34. The outer diameter of the pivot pin 30 closely fits the sleeve bearing and rigidly fastens to the plate 34.

Contained on the sleeve bearing 32 is a smooth straight surface 38, parallel to the axis of the shaft 24, the surface of which forms a plane intersecting the axis of the pivot pin 30, and is formed on one side of the shaft bearing 28 for engaging linear interface means 40 described below.

The angle measuring support means, or rectangular plate 34 has a smooth straight bearing surface 52 along its bottom edge, which may be rounded along its length, as shown in FIG. 4, to allow the plate 34 to tilt (as shown in dashed lines), in a second axis of angular adjustment, for example 17, while axis 15 is being aligned. This allows the chuck to be inclined in the axis perpendicular to the present axis of adjustment during the alignment procedure.

The angle measuring support means of this embodiment serves to provide a rigid means of attachment for the pivot means 30 and the displacement detecting means 54, discussed in detail below, so that the pivot means and the displacement detecting means are in rigid relation to each other. In addition, it permits the pivot means and displacement detecting means to translate in parallel relation to the work surface 16.

Located on the lower end of the shaft on the portion extending below the sleeve bearing 32 is shaft retaining means in the form of a shaft retaining ring 42, which serves to prevent the shaft from extending too far out of the sleeve bearing. Attached to the plate 34 and in parallel relation to the bottom surface 52 of the plate is the displacement detecting means 54 in the form of a digital electronic probe. Extending from the electronic probe 54 is a displacement detecting element 56 which moves in relation to the body of the probe 54 for measuring relative movement between the probe and the detecting element.

The electronic probe of this embodiment employs an opto-electronic encoder unit (not shown) resting stationary inside the body of the probe, and a glass scale (not shown) attached to the displacement detecting element. Equally spaced indicia or etchings on the glass scale are aligned in the optical path of the encoder unit which in turn produces electrical signals for interpretation into measurements quantizing the displacement of the detecting element 56. Biasing means (not shown) is contained in the body of the probe 54 for urging the detecting element 56 into contact with the surface 38 of the shaft assembly.

It is not in the scope of this invention to claim the technique of measurement utilized by the displacement detecting means since this method is well known to those familiar with the art. It is therefore believed to be unnecessary to describe its operation in further detail except to point out that the digital electronic probe 54 produces signal pulses suitable for interpretation into measurements of displacement of the shaft.

Interposed between the displacement detecting element 56 and the surface 38 on the sleeve bearing is linear interface means 40, embodied in the form of a rounded metal tip of known radius attached to the end of the detecting element 56 and aligned with its center axis 68. The extent of the radius of the tip 40 is such that the rounded or radial surface 58 of the tip contacts the surface 38 of the sleeve bearing throughout the desired range of angular motion of the shaft 24.

Since the geometry of contact between the surface 38 and the rounded tip 40 is known, it is a simple matter for those skilled in the art to derive a mathematical formula describing the effect the tip is having on the motion of the detecting element 56 throughout the motion of the shaft 24. Thus the pivotal movement of the shaft 24 is translated into movement of the displacement detecting element 56 in a linearly determinable manner.

Output from the displacement detecting means 54 is sent by electrical conductor 75, fiber optic cable, or otherwise suitable means, to computation means 60, in the form of an electronic or integrated circuit, for processing into information related to the angular inclination of the shaft 24. The computation means of this embodiment receives signal output from the digital electronic probe 54 and processes it for mathematical calculations. Using a previously stored constant relating to the vertical distance between the axis of the pivot pin 30 and the axis of the displacement detecting element 56, the computation means 60 then calculates trigonometrically, the angle of inclination of the shaft 24.

Design and programing of the computation means 60, for processing the signals coming from the displacement detecting means and performing the appropriate mathematical calculations is well established in the industry and familiar to those skilled in the art. For example, it is a routine task of those skilled in the art to create an algorithm for computing the arctangent of a "right" triangle with two known sides. Likewise, it is also a common practice to design electrical circuitry and computing algorithms which count electrical waveforms from an electronic probe employing an opto-electronic device, and to convert these wave forms into information regarding displacement of the moving element of the electronic probe. While the actual computing algorithm may require greater complexity than that required to compute a single arctangent of a "right" triangle, a mathematical formula can be easily derived, by one skilled in the art, based upon the geometry of the shaft bearing means (or angle measuring support means) and the linear interface means, and in turn can be incorporated into an algorithm enabling the computation means to calculate the angle of the shaft 24. For example the mathematical formula describing the angle of inclination of the shaft of this embodiment is:

$$t = \arctan[d/h + r/h - r/\cos t]$$

where h is the vertical distance, denoted 78, between the axis of the displacement detecting element 56 and the axis of the pivot pin 30, d is the displacement, denoted 80, measured by the displacement detecting means, r is the radius of the rounded tip 58, of the linear interface means 40, and t is the angle of inclination, denoted 84, of the shaft 24. As may be noted this particular formula has a transient solution which requires a number of successive calculations in order to arrive at a solution of sufficient accuracy. However, this is easily achieved by programing of the computation means 60 by those skilled in the art.

Output from the computation means 60 must be delivered to the user of the assembly 10 in a manner useful for communicating the angle of inclination of the shaft. For this purpose communication means 62, in the form of a digital display such as an array of seven-segment light emitting diodes, called LED's, are mounted to the outer cover 26 of the assembly 10, and are positioned to be readily viewed by the user.

The number of digits and the trigonometric mode of the display may vary depending upon the accuracy required of the assembly 10 and the trigonometric standard desired by the user. For example, the digital display 62 could represent the angle of inclination of the shaft in degrees, grads or radians. The number of digits required in the display depends upon the accuracy of the assembly 10, for example, if the display 62 is in the degrees mode, digits for degrees, arcminutes and arcseconds, requiring six digits in all, might be used if such accuracy is required. A mode switch 66 attached to the cover 26 enables the user to switch from one trigonometric mode to another, and the computation means 60 is programed, by means familiar to those in the art, to convert data related the angular inclination of the shaft into the trigonometric mode preferred by the user.

To make the assembly 10 self calibrating, calibration means is embodied in the form of a shaft locating mechanism 44 and resetting means 92 for the displacement detecting means 54. The shaft locating mechanism can be embodied in the form of a detent mechanism 44 located between the sleeve bearing 32 and the plate 34. A v-groove 46 is placed in the sleeve bearing and is engaged by a round-tipped probe 48 or otherwise suitable device attached to biasing means 50, in the form of a leaf spring, which is in turn mounted on the plate 34. The probe 48 is biased to engage the v-groove in a position where the sleeve bearing 32 is in an angular orientation perpendicular to the bottom bearing surface 52 of the plate 34, and is therefore, also perpendicular to the work surface 16. The probe 48 may be adjustably mounted to provide adjustment of the calibration means to compensate for errors in manufacture of individual components of the assembly.

The resetting means 92 of the calibration means serves to reset the measurement output of the displacement detecting means to zero or an otherwise appropriate reference dimension. Thus, with the shaft 24 located in a known position such as precisely perpendicular to the work surface, the displacement detecting means can be reset and any deviation in displacement from this position of perpendicularity may be known. Likewise, if it is desirable to achieve angular alignment of the machine tool with respect to a present setting, the resetting means can be activated and any subsequent movement of the shaft will be measured relative to the previous angle.

The method and construction of the resetting means 92 may vary depending upon the method and construction of both the displacement detecting means and the computation means used, and may be incorporated into the design of either. However, an electrical switch 92 attached to the cover 26 serves, in these embodiments, to activate the appropriate response in the circuitry of the computation means 60 to reset the displayed output of the communication means to zero. The method of such resetting in the computation means can be incorporated in its electrical design and programing and is familiar to those skilled in the art.

It is desirable for the smoothness of operation of the shaft bearing means (or angle measuring support means), the ease in setting up of the assembly, and its overall packaging, that a frame base 70 be interposed between the shaft bearing means 28 and the work surface 16. The frame base 70 of this embodiment is rectangular in shape with sides 72, in squared relationship to one another, and a flat bottom surface 74 for contact with the work surface 16. Located on the top of the frame base is a rounded groove 76 (FIG. 4) in parallel relation to at least one side 72 for receiving the bottom bearing surface 52 of the plate 34 of the shaft bearing means 28. The rounded groove 76 is parallel to the bottom surface 74 so that the shaft bearing means translates in parallel relation to the work surface 16, as shown by the dashed lines 39 in FIG. 2, and allows the plate 34 to tilt (shown by dashed lines 53) in a second axis which is perpendicular to the present (or first) axis of adjustment.

The outer sides 72 and contour of the frame base 70 are suited to accept a cover 26 for the assembly 10, and may also have at least one setup surface 86 in either perpendicular or parallel orientation to the movement of the shaft bearing means 34, for positioning the assembly 10 on the work surface 16 in parallel relation to an axis of adjustment of work surface. The setup surface 86 is suited for positioning a machinist's square (not shown), or similar tool familiar to those skilled in the art, which is in turn abutted to an edge of the work surface 16. In this way the assembly 10 can be aligned with a particular axis of adjustment of the machine tool to insure accurate alignment in the axis of angular adjustment.

Housing the angular alignment assembly 10 is a cover 26, made of suitable rigid material, which serves to prevent foreign matter such as dirt, cutting oils and milling chips from entering the assembly. The cover of this embodiment also serves to support communication means in the form of a digital display 62, electrical switches for resetting, and mode selection and power on and off switches for the assembly.

Located on the top surface of the cover is a slotted opening 88 and sealing means 90 for the shaft 24 that permits lateral and radial movement of the shaft while preventing foreign matter as described above from entering the opening. The sealing means 90 can be made of rubber, or an otherwise suitable material, and functions so that a purse-like opening surrounds the shaft 24 but gathers together to seal the slotted opening 88 where the shaft is not currently positioned.

Having completed a description of the first embodiment of the angular alignment assembly, various additional embodiments of certain features of the assembly 10 follow.

Figure 5:
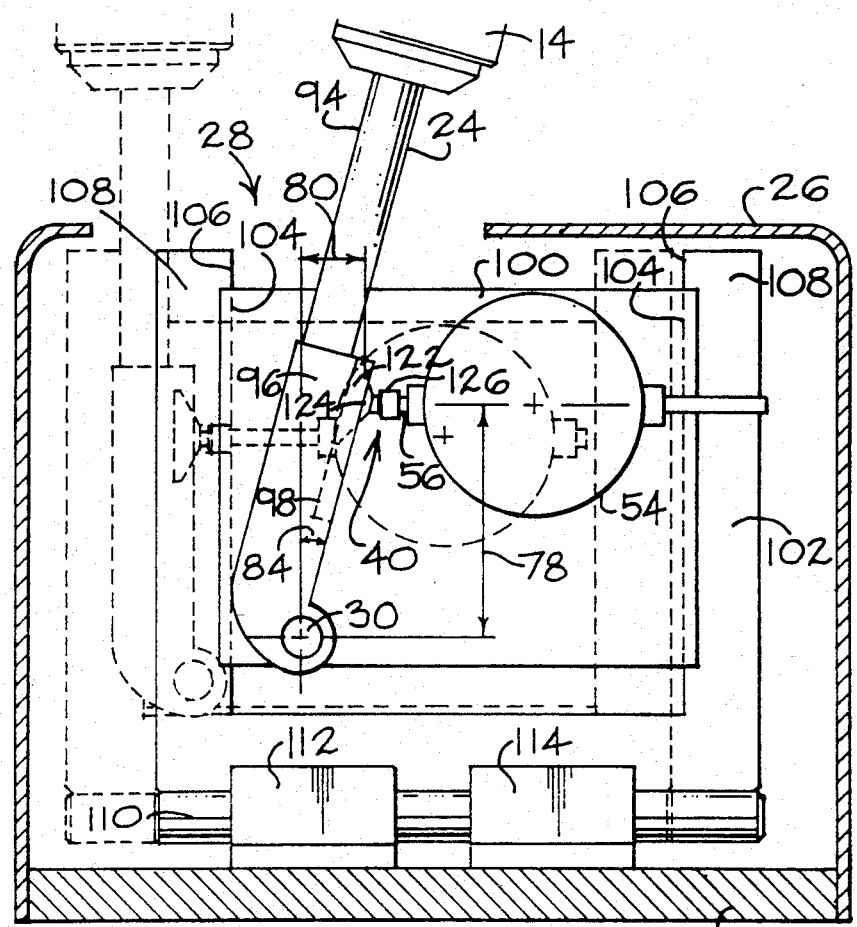
FIG. 5 is a front elevational view of an alternate embodiment of the angular alignment assembly of the present invention.
Figure 6:
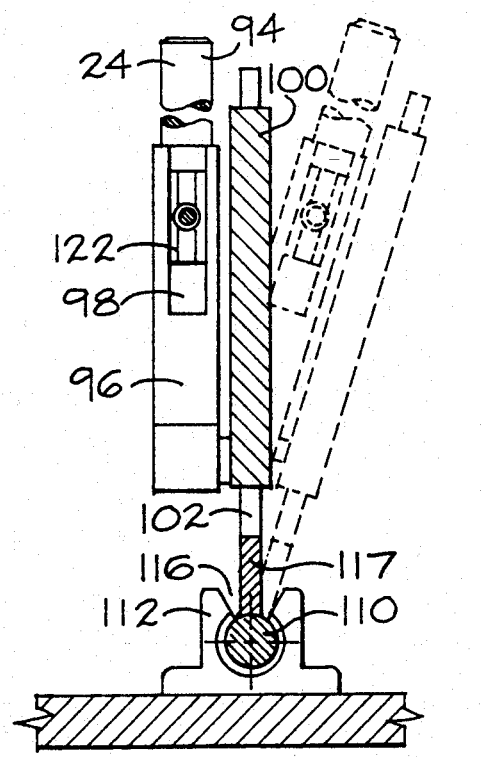
FIG. 6 is a side elevational view in partial section of FIG. 5.

FIGS. 5 and 6 illustrate the second embodiment of the angular alignment assembly. The shaft assembly comprises an elongated shaft 24, shaft bearing means 28 and pivoting means 30 as in the first embodiment.

The elongate shaft 24 of this embodiment is directly coupled to pivoting means 30 in the form of a pivot pin. The upper portion 94 of the shaft 24 is cylindrical in shape and adapted for receiving into the chuck 14. The lower portion 96 of the shaft is adapted for engaging the linear interface means 40 and is journaled to a pivot pin 30. The lower portion 96, which may be formed as an integral part of the upper portion 94 or press fit thereon, has a smooth straight surface 98 inset in groove, which is parallel to the axis of the upper portion, and which permits the linear interface means, describe in detail below, to travel in a plane intersecting the axis of the pivot pin 30. Also included in the lower portion of the shaft may be a v-groove (not shown), centered on the linear axis of the shaft for receiving a detent mechanism (not shown), as described in the first embodiment, for calibrating the invention.

The pivot pin 30 is rigidly attached to angle measuring support means in the form of a first shaft bearing means 100, for allowing vertical translation of the shaft 24, and a second shaft bearing means 102, for permitting horizontal translation of the shaft.

The first shaft bearing means 100 is a rigid rectangular plate with linear bearing surfaces 104, for engaging the second shaft bearing means 102 so that the movement of the plate 100 is restricted to vertical translation, represented by dashed lines, in a direction generally parallel to the bearing surfaces 104. Mounted on the first shaft bearing means 100, and in rigid relation to the pivot pin 30, is the displacement detecting means 54, the displacement detecting element 56 of which is in perpendicular relation to the bearing surfaces 104 for engaging the surface 98 of the shaft 24.

The second shaft bearing means 102 is built for receiving the first shaft bearing means 100 so that the translation of the first shaft bearing means is perpendicular to the movement of the second shaft bearing means. To facilitate this function the second shaft bearing means consists of a rigid u-shaped member 102, made of metal plate or an otherwise suitable material. Linear bearing surfaces 106 are located on the inner surface of the arms 108 of the second bearing member 102 and engage the bearing surfaces 104 to restrict the translation of the first bearing means 100 to movement generally parallel to the surfaces 106.

Attached to the bottom of the u-shaped member 102, or formed as an integral part thereof, is a cylindrical segment in the form of a ground shaft 110, the axis of which is in perpendicular relation to the bearing surfaces 106 and 104. The shaft 110 engages pillow blocks 112 and 114 for permitting translation of the second bearing member 102 in parallel orientation with respect to the work surface 16 as represented in dashed lines. The pillow blocks 112 and 114 are mounted to the frame base 70, and have an open segment 116 which is wider than the thickness of the portion 117 of the u-shaped member 102 joining to the cylindrical segment 110, for permitting the second bearing member 102 to pivot as shown in dashed lines in FIG. 6. Thus the shaft assembly can be inclined in the axis nonparallel to the present axis of adjustment of the chuck 14 of the machine tool 12 as described in the previous embodiment.

Interposed between the displacement detecting element 56 of the displacement detecting means 54 and the surface 98 of the shaft 24, is linear interface means in the form of a pivoting slide assembly 40, consisting of a slide 122, pivot pin 124 and pivot arm 126. The slide 122 is receivable in the grooved surface 98 of the shaft 24 and the pivot pin 124 of the slide 40 is positioned so that the pivoting axis of the slide assembly 40 coincides with a plane intersecting the pivoting axis of the shaft 24. The slide assembly is rigidly attached and centered on the displacement detecting element 56 by means of the pivot arm 126 which supports the pivot pin 124 in centered relation to the axis of the detecting element 56.

The result of this arrangement of linear interface means in the form of a pivoting slide assembly 40 is that the movement of the displacement detecting element 56 is simply the trigonometric tangent of the angle of inclination of the shaft 24, therefore the calculation required by the computation means 60 is greatly simplified, and can even be easily done with a pocket calculator in order to compute the angle of inclination of the tool holding assembly.

Having described the features which differ from those of the first embodiment, the remaining features of the second embodiment are substantially as described in the first embodiment, with the exception of the programing of the computation means.

Due to the different configuration of the linear interface means described above, the mathematical formula describing the angle of inclination of the shaft 24 of the second embodiment is:

$$t = \arctan d/h$$

where h is the vertical distance, denoted 78, between the pivoting axis of the shaft 24 and the axis of the displacement detecting element 56, d is the displacement, denoted 80, measured by the displacement detecting means 54, and t, denoted 84, is the angle of inclination of the shaft 24 with respect to the perpendicular position of the tool holding assembly.

Figure 7:
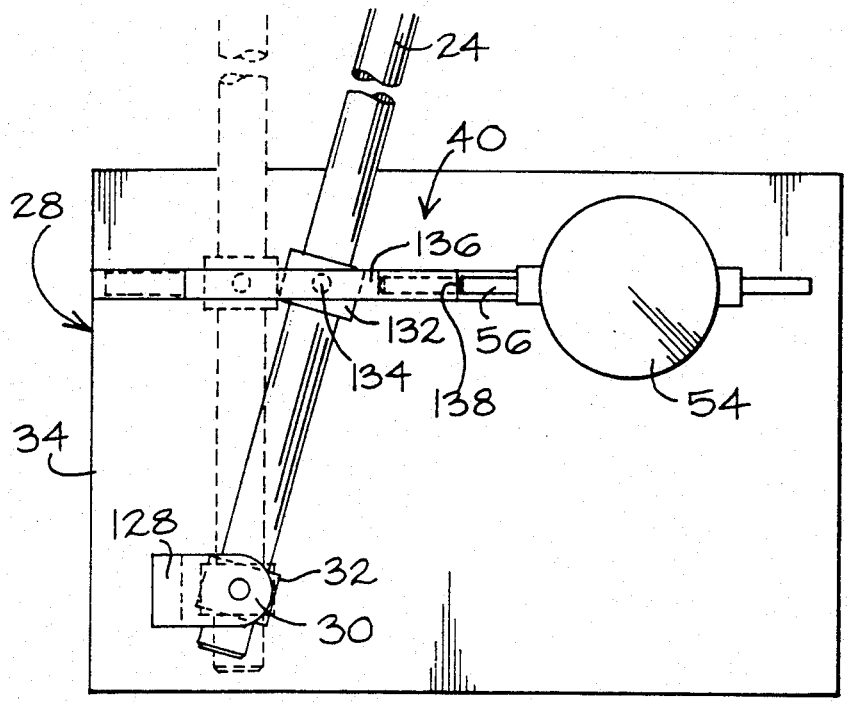
FIG. 7 is a front elevational view of an alternate embodiment of the angular alignment assembly of the present invention.

FIG. 7 illustrates the third embodiment of an angular alignment assembly in accordance with the present invention. The shaft assembly consists of an elongated shaft 24, shaft bearing means (or angle measuring support means) 28 and providing means 30, as in the previous embodiments.

The elongated shaft is substantially as described for the first embodiment and passes through a first shaft bearing means 32 in the form of a sleeve bearing which closely fits the diameter of the shaft 24 and allows the shaft to rotate and to move freely in the direction of its linear axis. The sleeve bearing 32 contains pivot means 30, concentrically centered on the sleeve and pivotally journaled, as represented in dashed lines, to a second shaft bearing means (or angle measuring support means) 34, which is in the form of a rectangle plate. The rectangular plate 34 is substantially the same as that described for the first embodiment, the difference being the presence of pivot support means 128. The pivot support means 128, in the form of an L-shaped member, is fixed rigidly to the plate 34 and extends perpendicularly from its surface and around the sleeve bearing 32 to pivotally support the pivoting means 30.

The linear interface means 40 of FIG. 7 consists of an interface sleeve bearing 132, interface pivot means 134 and linear bearing means 136. The interface sleeve bearing 132 closely fits the diameter of the shaft 24 and allows the shaft to rotate and to move freely in the direction of its liner axis. Interface pivot means 134, in the form of two pivot pins, formed as an integral part of the sleeve 132, or suitably attached thereon, are concentrically centered on either side of the sleeve bearing for allowing the sleeve 132 to pivot with the shaft 24. The pivot pins 134 are journaled to linear bearing means 136 in the form of a ball bearing race or otherwise suitable means which provides smooth and free movement of the sleeve 132, and is restricted to translation in parallel with the movement of the displacement detecting element 56.

Attached to the end 138 of the linear bearing means 136, or suitably biased for contact therewith, is the displacement detecting element 56, for measuring the displacement of the linear bearing means 136. The combination of interface sleeve bearing 132, interface pivot means 134 and linear bearing means 136 thus form the linear interface means 40 and permit the measurement made by the displacement detecting means 54 to be directly related to the center of the shaft 24. The result of this arrangement of linear interface means is that the movement of the displacement detecting element 56 is simply the trigonometric tangent of the angle of inclination of the shaft 24, and thus the tool holding assembly 14, thus greatly simplifying the calculation required by the computation means 60 (not shown), or other suitable device, such as a pocket calculator, to compute the angle of inclination of the tool holding assembly.

Having described its distinguishing features, this third embodiment is substantially as described in the first embodiment, the difference being that the programing of the computation means is like that described for the second embodiment.

Figure 8:
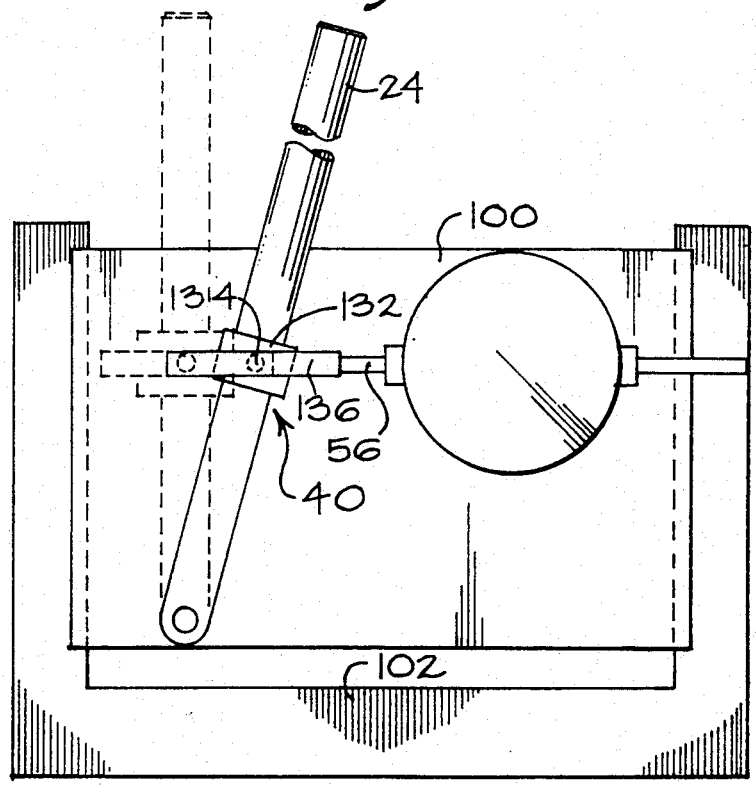
FIG. 8 is a front elevational view of an alternate embodiment of the angular alignment assembly of the present invention.

FIG. 8 illustrates the fourth embodiment of an angular alignment assembly in accordance with the present invention. The fourth embodiment is substantially as previously described in the second embodiment, the exception being that the linear interface means 40 is like that described for the third embodiment, and is operably mounted on the plate 100 in accordance with the second embodiment.

Figure 9:
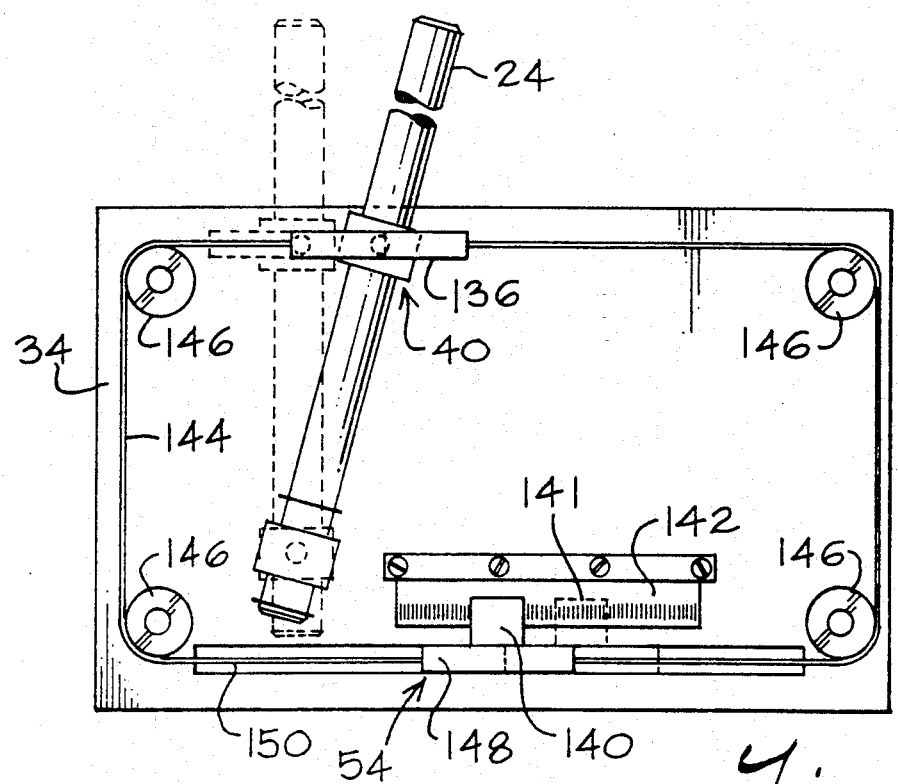
FIG. 9 is a front elevational view of an alternate embodiment of the angular alignment assembly of the present invention.

FIG. 9 illustrates the fifth embodiment of an angular alignment assembly in accordance with the present invention. The fifth embodiment is substantially as previously described in the third embodiment, the differences being that the displacement detecting means 54 and linear interface means 40 are of different construction, which may have significant size and cost advantage over that described in the previous embodiments.

The displacement detecting means 54 of FIG. 9 utilizes an incremental optical linear encoder head 140 and a glass scale 142. The glass scale 142 possesses, along its length, equally spaced indicia etched, printed or otherwise deposited on its surface. The encoder head 140 is positioned for precise linear movement, as represented in dashed lines 141, along the length of the glass scale such that the indicia are detected by the encoder head. When either the encoder head or the glass scale move with respect to each other, signal pulses proportional to the distance of movement are produced, and thus the distance of relative translation is quantized. It is not in the scope of the present invention to claim the technique of measurement utilized by the displacement detecting means since this method of displacement detection is well known to those familiar with the art. It is thus believed to be unnecessary to describe its operation in further detail except to point out that the encoder head 140 produces signal pulses suitable for interpretation, by the computation means, into measurements of displacement of the shaft 24.

The displacement detecting means of this embodiment may utilize linear interface means substantially as described in the third embodiment, the difference being the presence of flexible coupling means 144 for transferring motion of the linear bearing means 136 to the displacement detecting element, which in this case is the encoder head 140.

The flexible coupling means 144, in the form of a metal band of suitable width and thickness, couples the linear bearing means 136 to the encoder head 140 so that the displacement detecting means can be located on the shaft assembly at a location out of the path of travel of the linear bearing 136, thereby enabling its positioning at a more suitable location. To facilitate the use of the flexible coupling means, pulleys 146, rotatably fixed to the plate 34, direct the path of said coupling means 144, and properly tension it, so that the movement of the encoder head 140 is straight and rigidly related to the linear bearing means.

Further facilitating the linearity of movement of the encoder head 140 is a linear race 148, interposed between the flexible coupling means 144 and encoder head, which closely engages a linear raceway 150 located on the plate 34. The linear race 148 and raceway 150 serve in combination to restrict the movement of the encoder head to translation parallel to the movement of the flexible coupling means and prevent vibration and twisting of the encoder head as could possibly result from being mounted exclusively on the flexible metal band 144.

Rigidly mounted to the plate 34, and in parallel relation to the path of movement of the encoder head 140 is the glass scale 142. The mounting and positioning of the glass scale facilitates proper engagement with the encoder head for the proper operation of the displacement detecting means. Having described its distinguishing features, this fifth embodiment is substantially as previously described in the third embodiment.

Figure 10:
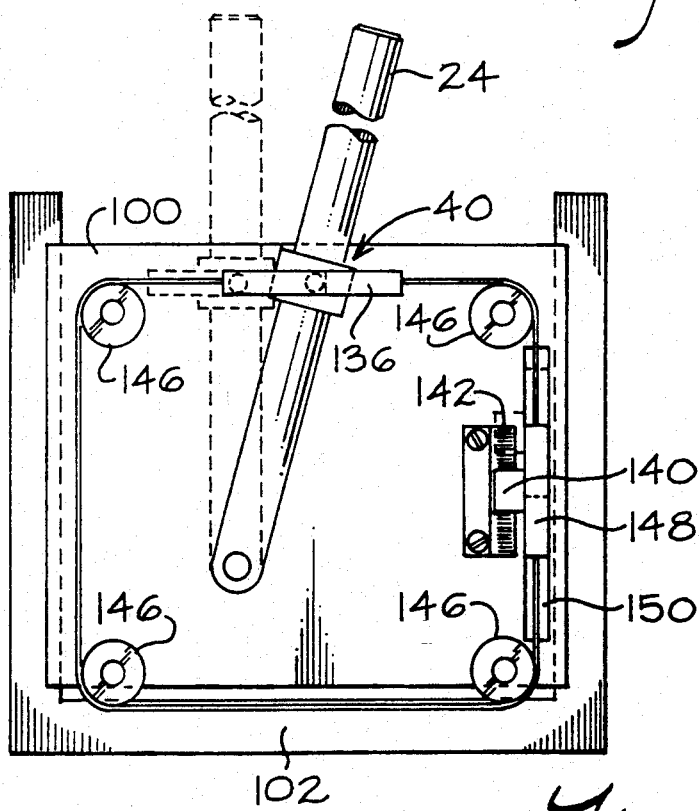
FIG. 10 is a front elevational view of an alternate embodiment of the angular alignment assembly of the present invention.

FIG. 10 illustrates the sixth embodiment of an angular alignment assembly in accordance with the present invention. The sixth embodiment is substantially as previously described in the fourth embodiment, the exception being that the linear interface means 40 is like that described for the fifth embodiment. In addition, the pulleys 146, raceway 150 and glass scale 142 are located on the plate 100 of the shaft assembly in accordance with the fourth embodiment.

Figure 11:
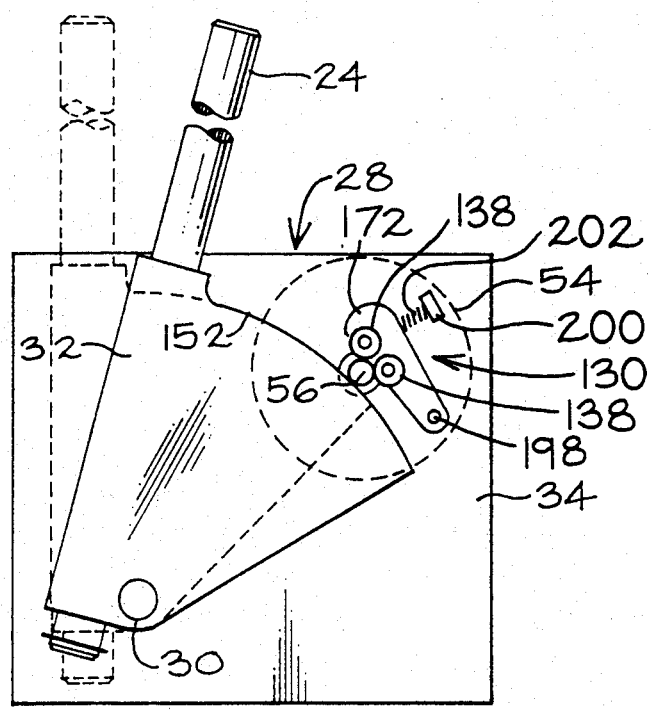
FIG. 11 is a front elevational view of an alternate embodiment of the angular alignment assembly of the present invention.

FIG. 11 illustrates the seventh embodiment of an angular alignment assembly in accordance with the present invention. The shaft assembly comprises an elongated shaft 24, shaft bearing means 28 and pivoting means 30 which are substantially as described in the first embodiment, the difference being found in the shape of the sleeve bearing 32.

The displacement detecting means of FIG. 11 utilizes a shaft encoder 54. The displacement detecting element of the shaft encoder 54, shown in hidden lines, is an elongated cylindrical shaft 56 extending from the center of the body of the shaft encoder body. When the shaft 56 rotates with respect to the body of the encoder, signal pulses are produced at regular angular intervals with regard to the shaft rotation. It is not in the scope of the present invention to claim the technique of measurement utilized by the shaft encoder since this method of displacement detection is well known to those familiar with the art. It is thus believed to be unnecessary to describe its operation in detail except to point out that the shaft encoder 54, when coupled with the sleeve bearing means as described below, produces signal pulses suitable for interpretation, by the computation means, into measurements of angular displacement of the shaft 24.

Extending radially from the center point of the pivot pin 30, and as an integral part of the sleeve bearing 32 is a smooth radiused surface 152. Contacting the surface 152 is the shaft 56 of the shaft encoder 54, the body of which is mounted rigidly to the shaft bearing means (or angle measuring support means) 34. The shaft 56 has its rotational axis in generally parallel alignment with the pivotal axis of the sleeve bearing 32 and frictionally engages the surface 152 so that pivotal movement of the sleeve bearing, and hence the surface 152, rotates the shaft 56, thereby quantizing the pivotal movement of the sleeve bearing. The angular extension of the surface 152 is depenedent upon the range of angular measurement desired by the angular alignment assembly. The shaft encoder 54 is positioned on the plate 34 to engage the surface throughout its range of travel.

To assist the shaft 56 in frictionally engaging the surface 152 friction enhancing means 130 in the form of a pair of roller bearings 138 biased to force the shaft 56 into contact with the surface 152 is used. The roller bearings 138 are operably mounted to a lever 172 in order to locate contact of the bearings 138 on the shaft 56 at an area generally opposite the contact point between the shaft 56 and the surface 152. The lever 172, made of suitably rigid material, is operably mounted to the plate 34 by means of a pivot pin 198, which allows the lever 172 the necessary freedom of movement to press against the shaft 56. Forcing the lever 172 against the shaft 56 is biasing means 202, in the form of a spring interposed between the lever 172 and biasing support means 200. The biasing support means 200, in the form of a tab extending rigidly from the plate 34 backs up the spring 202 and transfers the energy of the spring 202 of the roller bearings 138. The net result of friction enhancing means 130 is that a continuous force is placed on the shaft 56 to insure that it does not slip against the surface 152, yet also does not interfere with the free rotation of the shaft 56.

Having described its distinguishing features, the seventh embodiment is substantially as previously described in the first embodiment, with an additional difference being that the computation means 60 (not shown) is programmed to translate the pulses resulting from the rotational movement of the shaft encoder into output related to the angular inclination of the shaft 24, instead of performing the trigonometric calculations described in the first embodiment.

Figure 12:
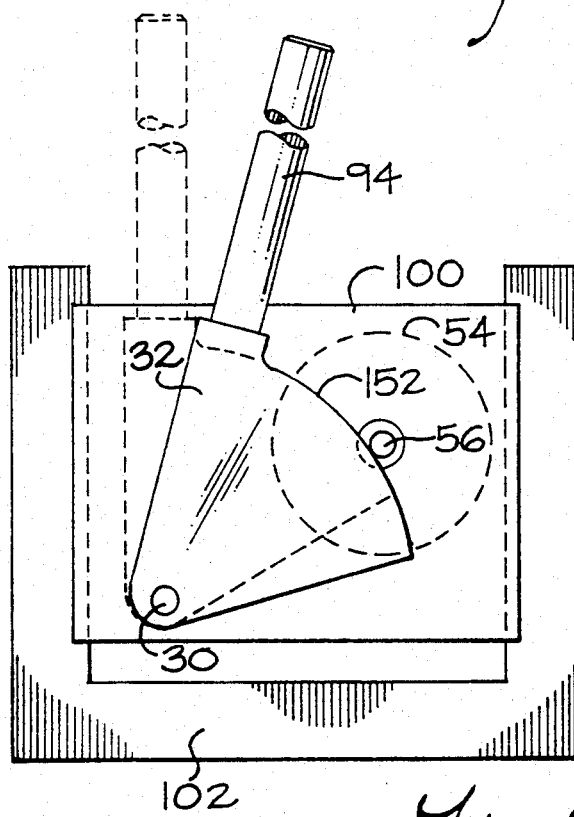
FIG. 12 is a front elevational view of an alternate embodiment of the angular alignment assembly of the present invention.

FIG. 12 illustrates the eighth embodiment of an angular alignment assembly in accordance with the present invention. The eighth embodiment is substantially as previously described in the second embodiment, the exception being that the sleeve bearing 32 and programming of the computation means 60 (not shown) is like that described for the seventh embodiment.

Figure 13:
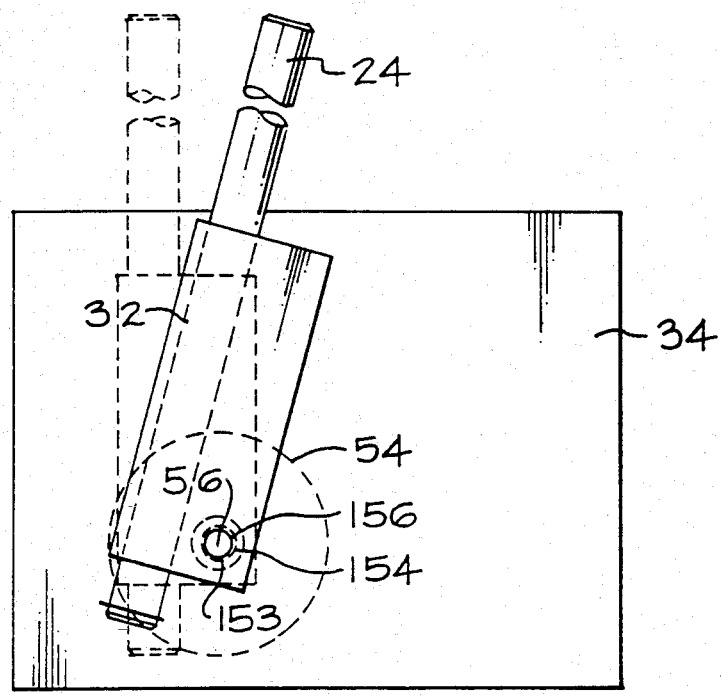
FIG. 13 is a front elevational view of an alternate embodiment of the angular alignment assembly of the present invention.

FIG. 13 illustrates the ninth embodiment of an angular alignment assembly in accordance with the present invention. The ninth embodiment is substantially like that described in the seventh embodiment, the differences being the absence of the surface 152 located on the sleeve bearing 32. In addition, the shaft 56 of the shaft encoder 54, shown in hidden lines, is coupled directly to the pivot means 153. The pivot means 153 is in the form of a cylindrical pin having an outer cylindrical surface 154 for receiving the sleeve bearing 32, to allow the pivoting thereof. The cylindrical pin 153 also has an inner cylindrical surface 156 for receiving the shaft 56 of the shaft encoder 54, which frictionally or otherwise suitable engages the shaft 56, thereby causing the shaft 56 to pivot with the shaft 24.

Figure 14:
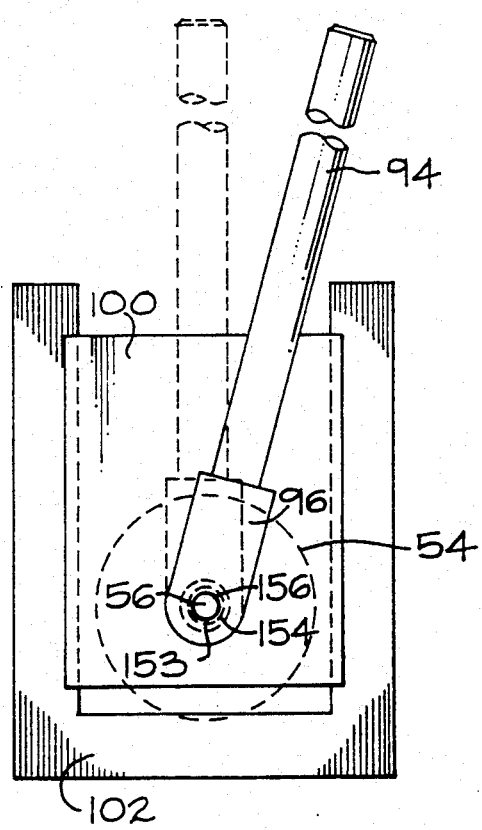
FIG. 14 is a front elevational view of an alternate embodiment of the angular alignment assembly of the present invention.

FIG. 14 illustrates the tenth embodiment of an angular alignment assembly in accordance with the present invention. The tenth embodiment is substantially as described in the eighth embodiment, the difference being that the pivot pin 36 and positioning of the shaft encoder 54 is like that described in the ninth embodiment.

Figure 15:
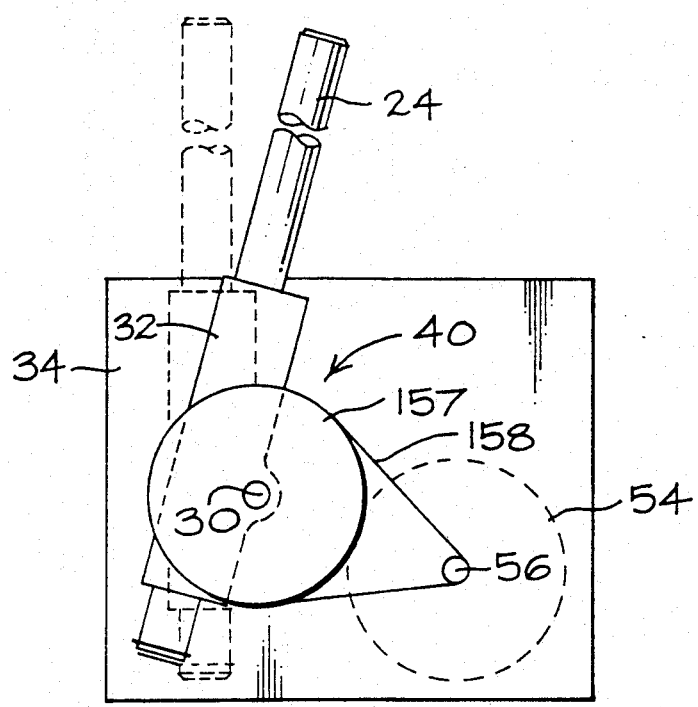
FIG. 15 is a front elevational view of an alternate embodiment of the angular alignment assembly of the present invention.

FIG. 15 illustrates the eleventh embodiment of an angular alignment assembly in accordance with the present invention. The eleventh embodiment is similar to that described in the seventh embodiment, the differences being found in the sleeve bearing 32. The sleeve bearing 32 closely fits the shaft 24 and allows free axial and rotational translation of the shaft, as in the previous embodiments. However, instead of the radial member 152 (FIG. 11) extending from the side of the sleeve bearing, as described in the seventh embodiment, a cylindrical member 157 is attached to the sleeve bearing. The cylindrical member 157 is placed in centered relation to the pivotal axis of the sleeve bearing 32 and is formed for receiving flexible coupling means described below. Transferring pivotal motion of the shaft to the encoder 54 is flexible coupling means 158 in he form of a flexible metal band, forming a belt, which couples the rotational motion of the cylindrical member 157 to the shaft 56 of the shaft encoder 54. The shaft encoder 54, shown in hidden lines, is positioned both to allow pivotal movement of the sleeve bearing throughout the desired range of adjustment of the machine tool and to properly tension the flexible coupling means between the cylindrical member 157 and the shaft 56 of the shaft encoder 54.

Figure 16:
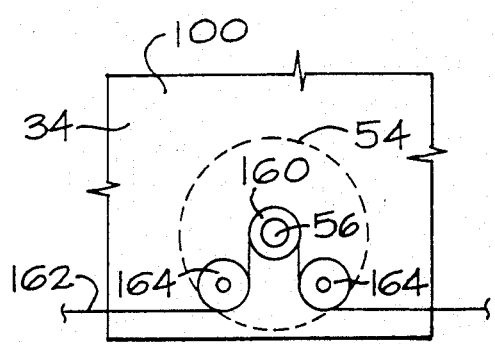
FIG. 16 is a front elevational view of an alternate embodiment of the displacement detecting means and linear interface means of the present invention.

FIG. 16 illustrates an alternative embodiment of linear interface means and displacement detecting means for the fifth and sixth embodiments (FIGS. 9 and 10) of an angular alignment assembly in accordance with the present invention. FIG. 16 shows a shaft encoder 54 mounted on the plate 34 of the fifth embodiment, or plate 100 of the sixth embodiment, in the approximate position of the encoder head and glass scale of said fifth and sixth embodiments. The shaft 56 extends through an opening in the plate and may receive a shaft pulley 160. Interconnected to the linear bearing means 136 (FIGS. 9 and 10) is a belt 162 which contacts the pulley 160. Two idler pulleys 164 are positioned on either side of the pulley 160 in order to extend contact of the belt with the pulley thereby facilitating proper contact between the pulley 160 and belt 162. The resulting mechanism is thereby able to determine the angle of inclination of the shaft 24 since its angular movement is coupled to the shaft encoder by means of the belt 162.

Figures 17, 18:
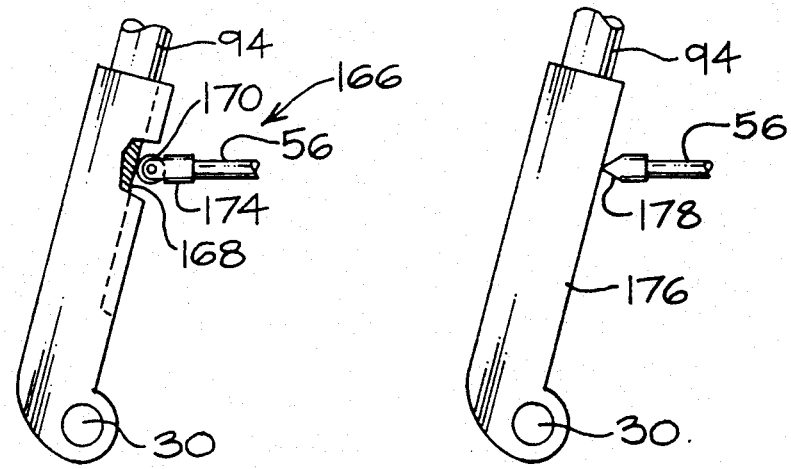
FIG. 17 is a front elevational view of an alternate embodiment of the linear interface means of the present invention.
FIG. 18 is a front elevational view of an alternate embodiment of the linear interface means of the present invention.

FIG. 17 illustrates an additional embodiment of the linear interface means in accordance with the present invention. The shaft assembly is like that described in the second embodiment except that the smooth straight surface 98 (FIG. 5) is replaced by a groove 168 for receiving a roller bearing assembly 166. The depth of the groove is such that the center point of the bearing 170 forms a plane, in its motion, intersecting the axis of the pivot pin 30 as it rolls in the groove 168. The roller bearing 170 is mounted to the end of the displacement detecting element by means of a bearing harness 174 which permits the free rotation of the bearing wire suitably restricting other possible motions. The resulting arrangement of linear interface means in the form of a roller bearing assembly 166 is that the movement of the displacement detecting element 56 is the trigonometric tangent of the angle of inclination of the shaft 94, thereby simplifying the calculation required to compute the angle of inclination of the tool holding assembly as described in previous embodiments.

FIG. 18 illustrates an additional embodiment of the linear interface means in accordance with the present invention. The shaft assembly is like that described in the second embodiment except that the smooth straight surface 98 (FIG. 5) is replaced by a surface 176 for receiving a pointed tip 178 mounted on the end of the displacement detecting element. The position of the surface is such that the center point of the tip 178 forms a plane, in its motion, intersecting the axis of the pivot pin 30 as it moves along the surface 176. The resulting arrangement of this embodiment of linear interface means is that the movement of the displacement detecting element 56 is the trigonometric tangent of the angle of inclination of the shaft 94, thereby simplifying the calculation required to compute the angle of inclination of the tool holding assembly as described in previous embodiments.

Figure 19:
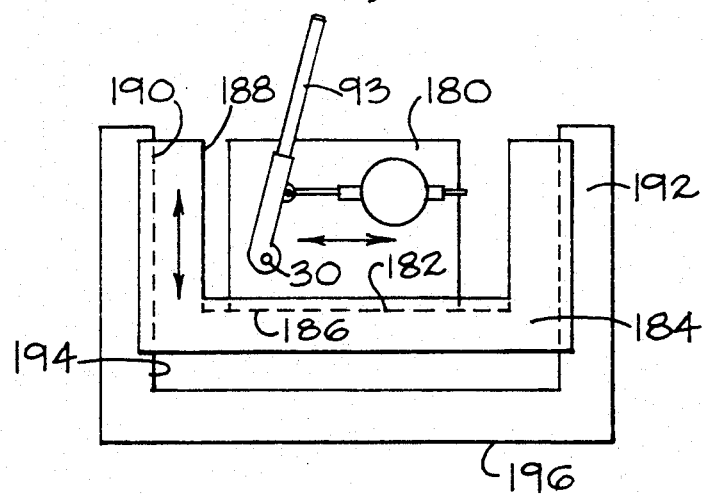
FIG. 19 is a front elevational view of an alternate embodiment of the shaft assembly of the present invention.

FIG. 19 illustrates an alternate embodiment of the shaft assembly in accordance with the present invention. The shaft 93 is pivotally mounted by pivoting means 30 to a first shaft bearing (or angle measuring support means) 180, in the form of a rectangular plate. The first shaft bearing 180 has a bearing surface 182 which engages a second shaft bearing 184, and permits the first bearing 180 to translate in parallel to the work surface 16 (FIG. 1). The bearing surface 182 also allows the first bearing 180 to tilt about a second axis nonparallel to the first axis being adjusted, as has been described in features of previous embodiments of the shaft assembly.

The second shaft assembly 184 is illustrated in a U-shaped member which has a bearing surface 186 to engage the bearing surface 182, which functions as described above. The inner surfaces 188 of the U-shaped member 184 are in spaced apart relation so that the first bearing member 180 has sufficient room for parallel and pivotal travel. The outer surfaces 190 form vertical bearing surfaces for guiding the shaft assembly in vertical travel and engage a frame 192.

The frame 192 is illustrated in the form of a U-shaped member having bearing surfaces 194 which engage the second bearing 184 to allow vertical translation of the shaft assembly as described above. The length of the arms of the U-shaped member are of such length to assure sufficient range of travel for the shaft assembly. The bottom surface 196 of the frame 192 is formed to be generally perpendicular to the vertical motion of the shaft assembly, and can either come into direct contact with the work surface 16 or be supported so that it is generally parallel to it.

Having described the possible embodiments of an angular alignment assembly, one can see that it can greatly facilitate the alignment of a shaft holding device with respect to a flat surface especially when used to align the tool holding means of a machine tool with respect to its work surface.

While the above description contains many details, these should not be construed as limitations on the scope of the invention, but rather as examples of the preferred embodiments thereof. Many variations are possible. For example, in the first, second, third, fourth, seventh, eighth and ninth embodiments, the relative position of the pivoting means and the displacement detecting means might be interchanged so that the displacement detecting means is positioned below the pivot point of the sleeve bearing. This configuration would have the benefit of shortening the length of shaft between the shaft and the pivoting means, thereby reducing possibility of error due to flexure of the elongated shaft. Another possible variation from the above described embodiment is that the pivot pin of the first, second and seventh embodiments could be centered on the axis of the shaft 24 or at any number of other locations other than in the plane of travel established by the linear interface means. Similarly, the pivot pin of the linear interface means does not have to coincide, in its plane of movement, with the pivot pin, as is described in the second embodiment. Corresponding changes to the computing algorithm of the computation means will correct for pivot pin locations out of the plane of movement of the linear interface means. In a further example, the displacement detecting means of the fifth and sixth embodiments, composed of an encoder head and glass scale, can be interchanged in their positions so that the glass scale becomes the movable displacement detecting element and the encoder head is the stationary element fixed to the mounting plate. In these same embodiments more or less than four pulleys could be used for the purpose of positioning the flexible coupling means in a position suitable for movement of the displacement detecting element. Other examples of possible variations include the eleventh embodiment, which can easily be constructed to incorporate a shaft assembly like that in the second embodiment. Similarly the embodiments of the linear interface means of FIGS. 17 and 18 can easily be incorporated in a shaft assembly like that of the first embodiment. With regard to the displacement detecting means, a digital electronic indicator, encoder head and ground glass, and a shaft encoder have been identified in the preferred embodiments. However, other measurement devices using the principles of capacitance, servo accelerometry and simple dial indicators, to name a few, can be adapted for the purposes of measurement in the invention. Accordingly, the scope of the invention should be determined not by the embodiments illustrated, but by the appended claims and their legal equivalents.

What is claimed is:

1. An angular alignment assembly for aligning the tool holding assembly in a machine tool assembly at various angles with respect to a work surface, the angular alignment assembly comprising:

an elongated shaft slidably mounted in a sleeve bearing, one portion of said shaft being adaptable for mounting in the tool holding assembly, the sleeve bearing being pivotally mounted to angle measuring support means for allowing the shaft to pivot about a first axis and for allowing vertical and horizontal movement of said shaft with respect to the work surface and for allowing the shaft to tilt about a second axis nonparallel to the first axis, said angle measuring support means also having bearing means for translating said angle measuring support means in parallel relation to the work surface, and angle measuring means operably mounted to said angle measuring support means for determining the angular orientation of said shaft with respect to the work surface and which does not restrict the pivotal movement of the sleeve bearing about the first axis.

2. An angular alignment assembly in accordance with claim 1 wherein the angle measuring means is coupled to the sleeve bearing at a pivot point along said first axis for detecting movement of the shaft.

3. An angular alignment assembly in accordance with claim 1 wherein the sleeve bearing contains a radiused surface, and said angle measuring means is a shaft encoder adapted to contact said radiused surface whereby the pivoting of the sleeve bearing and shaft causes said encoder to rotate for detecting movement of the shaft.

4. An angular alignment assembly in accordance with claim 1 wherein the sleeve bearing contains a cylindrical member placed in centered relation on the pivotal axis of the sleeve bearing, and the angle measuring means is a shaft encoder adapted to contact a flexible coupling means interposed between said cylindrical member and shaft encoder whereby the pivoting of the sleeve bearing and shaft causes said encoder to rotate for detecting movement of the shaft.

5. An angular alignment assembly in accordance with claim 1 wherein the angle measurement means is a shaft encoder.

6. An angular alignment assembly in accordance with claim 1 further comprising computation means, said computation means being interfaced to the angle measuring means for receiving signals from said angle measuring means and using said signals to compute the angle of inclination of the shaft.

7. An angular alignment assembly in accordance with claim 6 further comprising communication means, said communication means being interfaced to the computation means for receiving signals from said computation means for communicating the angle of inclination of the shaft.

8. An angular alignment assembly in accordance with claim 6 further comprising calibration means, said calibration means including a positioning means interposed between the shaft and angle measuring support means for determining a predetermined angular position of the shaft, said calibration means also including resetting means incorporated into the computation means for setting the output of the angle measuring means to a predetermined value.

9. An angular alignment assembly in accordance with claim 8 wherein the positioning means includes a detent means for determining the predetermined angular position of the shaft.

10. An angular alignment assembly in accordance with claim 1 further comprising a base interposed between the bearing means of the angle measuring support means and the work surface for providing a suitable and reliable interface between said bearing means and said work surface.

11. An angular alignment assembly in accordance with claim 10 wherein the base contains a setup surface for positioning said base in order to allow the shaft to pivot about the first axis, said first axis being perpendicular to an axis of adjustment of the work surface.

12. An angular alignment assembly in accordance with claim 1 wherein the angle measuring support means includes a vertically translating member and a horizontally translating member, said vertically translating member being operably mounted on said horizontally translating member, said vertically translating member pivotally supporting the sleeve bearing and shaft and allowing vertical translation of said shaft and supporting the angle measuring means said horizontally translating member allowing horizontal translation of said shaft.

13. An angular alignment assembly in accordance with claim 1 wherein the angle measuring means is biased with biasing means to contact a surface of the sleeve bearing.

14. An angular alignment assembly in accordance with claim 13 wherein the angle measuring means is a shaft encoder and the shaft of the shaft encoder has been adapted to contact a radiused surface of said sleeve bearing and the biasing means is a roller bearing means biased for pushing said shaft into said radiused surface in order to enhance the frictional engagement between said shaft and said radiused surface whereby the pivoting of the sleeve bearing causes said shaft encoder to rotate.

15. An angular alignment assembly in accordance with claim 1 further comprising tilting means located on the angle measuring support means for allowing the sleeve bearing and shaft to tilt in a direction other than the direction of the pivot of the sleeve bearing and shaft.

16. An angular alignment assembly in accordance with claim 1 further comprising shaft retaining means for limiting the travel of the shaft in the sleeve bearing in the direction of the axis of the shaft.

17. An angular alignment assembly in accordance with claim 1 further comprising a cover and shaft sealing means for preventing dirt and other foreign matter from entering the angular alignment assembly.

18. An angular alignment assembly in accordance with claim 1 wherein the angle measuring support means includes a first shaft bearing which is a horizontally translating member operably mounted on a second shaft bearing which is a vertically translating member, said second shaft bearing being operably mounted to a base, said base contacting the work surface.

19. An angular alignment assembly for aligning the tool holding assembly in a machine tool assembly at various angles with respect to a work surface, the angular alignment assembly comprising:
  an elongated shaft slidably mounted in a sleeve bearing, one portion of said shaft being adaptable for mounting in the tool holding assembly, the sleeve bearing being pivotally mounted to
  angle measuring support means for allowing the shaft to pivot about a first axis and for allowing vertical and horizontal movement of said shaft with respect to the work surface and for allowing the shaft to tilt about a second axis nonparallel to the first axis, said angle measuring support means also having
  bearing means for translating said angle measuring support means in parallel relation to the work surface, and
  angle measuring means having a movable displacement detecting element, said angle measuring means operably mounted to said angle measuring support means for determining the angular orientation of said shaft with respect to the work surface, and
  linear interface means interposed between the sleeve bearing and the angle measuring means for translating pivotal movement of the sleeve bearing and shaft into movement of the angle measuring means in a linearly determinable manner.

20. An angular alignment assembly in accordance with claim 19 wherein a surface of the sleeve bearing for contact of the linear interface means is centered on the axis of pivot of said sleeve bearing and in generally parallel orientation with the shaft.

21. An angular alignment assembly in accordance with claim 19 wherein the linear interface means is a pivotal slide located on the end of the movable displacement detecting element for contact with a surface of the sleeve bearing.

22. An angular alignment assembly in accordance with claim 19 wherein the linear interface means is a roller bearing means located on the end of the movable displacement detecting element for contact with a surface of the sleeve bearing.

23. An angular alignment assembly in accordance with claim 19 wherein the linear interface means is a pointed end located on the end of the movable displacement detecting element for contact with a surface of the sleeve bearing.

24. An angular alignment assembly in accordance with claim 19 wherein the linear interface means is a rounded end located on the end of the movable displacement detecting element for contact with a surface of the sleeve bearing.

25. An angular alignment assembly in accordance with claim 19 wherein the linear interface means comprises an interface sleeve bearing being slidably mounted on the shaft and pivotally mounted on linear bearing means, said linear bearing means being operably mounted to the angle measuring support means for sliding in parallel relation to the movable displacement detecting element of the angle measuring means and having a surface for contact with said displacement detecting element.

26. An angular alignment assembly in accordance with claim 25 further comprising flexible coupling means interposed between the linear interface means and the displacement detecting element.

* * * * *